United States Patent
Liddington

(10) Patent No.: US 9,593,680 B2
(45) Date of Patent: Mar. 14, 2017

(54) METHOD OF CONTROLLING VACUUM PUMP FOR VEHICLE BRAKE BOOSTER

(75) Inventor: Chris Liddington, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 463 days.

(21) Appl. No.: 14/128,843

(22) PCT Filed: Jun. 28, 2012

(86) PCT No.: PCT/EP2012/062634
§ 371 (c)(1),
(2), (4) Date: Mar. 13, 2014

(87) PCT Pub. No.: WO2013/004601
PCT Pub. Date: Jan. 10, 2013

(65) Prior Publication Data
US 2015/0037172 A1    Feb. 5, 2015

(30) Foreign Application Priority Data

Jul. 1, 2011  (GB) .................................. 1111231.5

(51) Int. Cl.

| | |
|---|---|
| F15B 7/00 | (2006.01) |
| F04B 49/02 | (2006.01) |
| B60T 13/72 | (2006.01) |
| B60T 13/52 | (2006.01) |
| B60T 13/66 | (2006.01) |
| B60T 17/02 | (2006.01) |
| F04B 35/00 | (2006.01) |

(52) U.S. Cl.
CPC .............. *F04B 49/02* (2013.01); *B60T 13/52* (2013.01); *B60T 13/662* (2013.01); *B60T 13/72* (2013.01); *B60T 17/02* (2013.01); *F04B 35/002* (2013.01); *F04B 2207/02* (2013.01)

(58) Field of Classification Search
CPC .......... F04B 49/02; F04B 49/06; B60T 13/52; B60T 13/72
See application file for complete search history.

(56) References Cited

U.S. PATENT DOCUMENTS 4,358,928 A * 11/1982 Kotwicki .............. F04B 49/025
60/397
4,412,416 A    11/1983 Van House
(Continued)

FOREIGN PATENT DOCUMENTS

| CN | 201816579 U | 5/2011 |
|---|---|---|
| JP | 09-058457 | 3/1997 |
| JP | 2006199078 A | 8/2006 |

OTHER PUBLICATIONS

International Search Report for International application No. PCT/EP2012/062634 dated Nov. 20, 2012.
(Continued)

*Primary Examiner* — Michael Leslie
(74) *Attorney, Agent, or Firm* — Carlson, Gaskey & Olds

(57) ABSTRACT

An electric brake booster vacuum pump of a vehicle has a deactivation level determined according to a percentage of maximum available vacuum at the instant altitude of the vehicle. The activation level may be determined in the same way. The invention provides for earlier on-switching of a vacuum pump at altitude, while ensuring that the off-switching value is achievable at low atmospheric pressure.

17 Claims, 3 Drawing Sheets

(56) References Cited

U.S. PATENT DOCUMENTS

Figure 1:
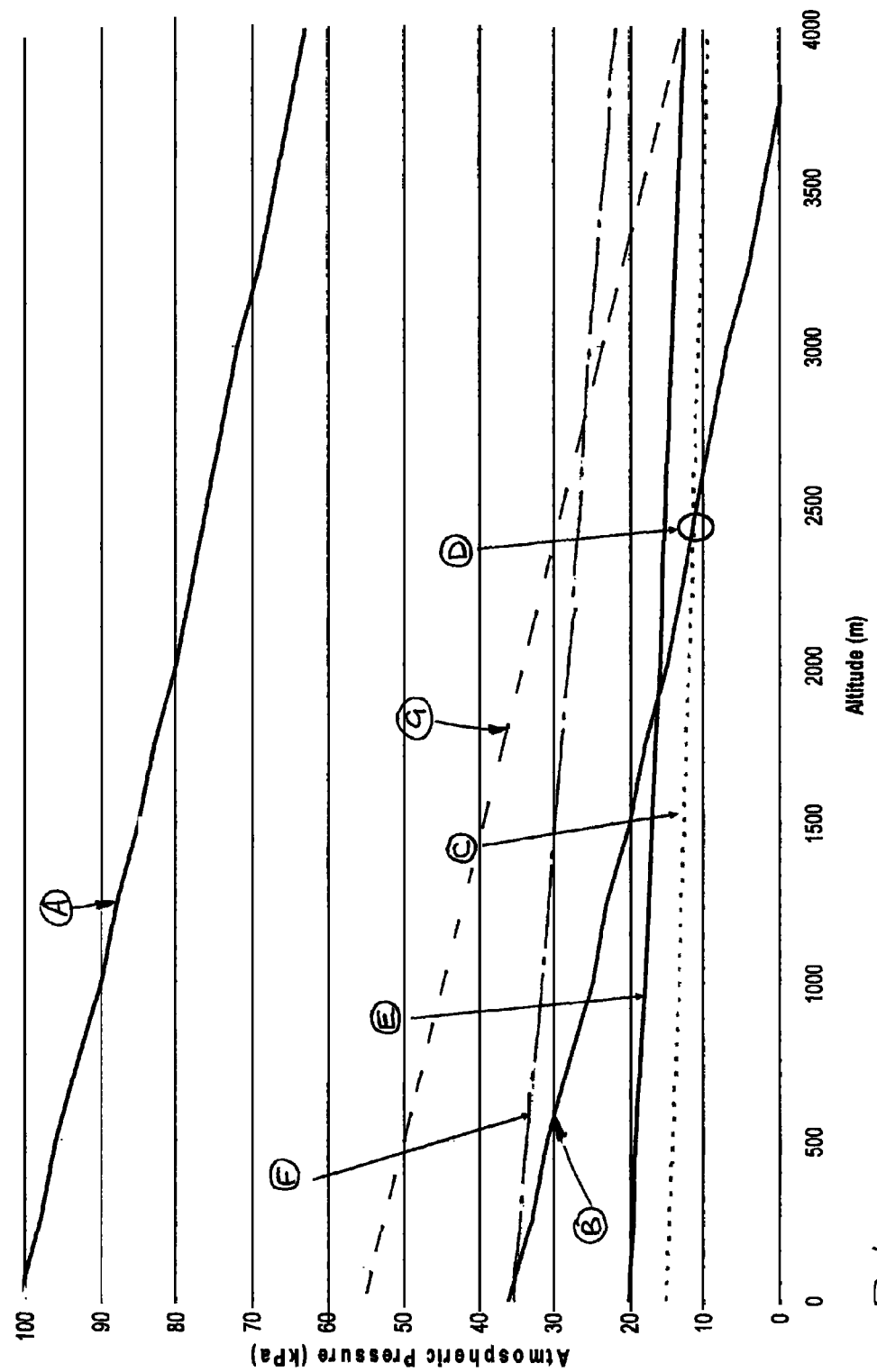

| | | | |
|---|---|---|---|
| 5,515,676 A * | 5/1996 | Earle | B60T 13/46 60/410 |
| 6,301,883 B1 * | 10/2001 | Fulks | B60T 13/46 60/397 |
| 6,955,406 B2 * | 10/2005 | Blue | B60T 17/02 188/112 R |
| 2005/0178622 A1 | 8/2005 | Blue | |
| 2008/0136252 A1 | 6/2008 | Ro | |
| 2008/0164753 A1 | 7/2008 | Crombez et al. | |

OTHER PUBLICATIONS

Combined Search and Examination Report under Sections 17 and 18(3) for Application No. GB1111231.5 dated Nov. 2, 2011.

* cited by examiner

METHOD OF CONTROLLING VACUUM PUMP FOR VEHICLE BRAKE BOOSTER

The present invention relates to vacuum pumps for vehicle brake boosters, and particularly to electric vacuum pumps. Aspects of the invention relate to a method and to a vehicle.

BACKGROUND

Motor vehicles are typically provided with servo-assistance of the braking system, so as to proportionately reduce the load applied to the brake pedal for a given braking effect. Many different kinds of servo-assistance have been proposed, but vacuum assistance via a vacuum brake booster is most common.

In such a booster, vacuum exhausts a brake booster chamber which is divided by a diaphragm. By opening one side of the diaphragm to atmosphere, a net force can be applied by the diaphragm to a piston of a hydraulic brake circuit. Suitable control means ensure assistance is proportional to the applied brake pedal load. The source of vacuum is typically a vacuum pump driven mechanically by the vehicle engine and/or engine inlet manifold depression.

More recently electric vacuum pumps have become preferred because they are independent of the vehicle engine and thus allow more flexibility in engine design and engine compartment utilization (packaging). Furthermore electric vacuum pumps can be switched on and off according to demand, and this can avoid the unnecessary energy consumption of an idling mechanically driven pump; switching on demand also gives a potentially longer service life for the pump.

A conventional electric vacuum pump for a vehicle brake booster incorporates a vacuum switch or sensor in the vacuum line to the brake booster, or in the brake booster chamber. A switch provides simple on/off control, whereas a sensor provides an electric signal which is an analogue of the depression available in the booster; both arrangements permit the pump to be switched on and off according to booster demand. The control system includes a degree of hysteresis to avoid continual pump activation/deactivation, and has fixed on and off values.

One switching strategy relies on percentages of absolute vacuum, which is typically −101 kPa (assuming atmospheric pressure at sea level to be 101 kPa).

On and off switching values are selected, for example at 65% and 80% of this maximum available vacuum (MAV), as indicated by the vacuum sensor or switch. In this arrangement on-switching occurs at −101 kPa*0.65=−65.6 kPa, and off-switching occurs at −101 kPa*0.80=−80.8 kPa. These fixed switching points are selected according to parameters of the vehicle braking system and the intended duty of the vehicle. The off-switching value is set to accommodate the achievable vacuum of a pump in good condition, which may be around 85% MAV.

At high altitude atmospheric pressure is reduced, with the possible consequence that, once switched-on, an electrical vacuum pump might not switch-off if the off-switching point is close to, or exceeds the maximum depression achievable by the pump. Continuous running of the pump may reduce pump efficiency, may have an effect upon pump life, and may result in high pump temperature. It would be advantageous to provide a solution to ameliorate or eliminate these high altitude effects.

It is known to compensate for altitude in vehicle systems which incorporate a vacuum pump.

US-A-2005/0178622 discloses a sensor of atmospheric pressure, and a look-up table which prescribes values of depression at which occur activation and deactivation of a vacuum pump. As altitude increases both the activation and deactivation values reduce. This arrangement provides step changes in the activation and deactivation values, and is somewhat complex in requiring the necessary control and memory apparatus, and initial calibration.

U.S. Pat. No. 4,412,416 discloses a diaphragm sensor having an internal coil spring operable to switch an electric vacuum pump on and off. This sensor provides altitude compensation, but has a fixed on/off range for all altitudes. As a consequence an on/off range which is suitable for sea level gives a somewhat wide on/off range at altitude, which means that the pump on value may be at a lesser depression than is desirable if the off value is within the capability of the vacuum pump. If however the range is reduced so that the on value at altitude is at a greater depression, the vacuum pump may run more frequently than is desirable, especially at lower altitudes.

SUMMARY

According to one aspect of the present invention there is provided a method of deactivating an electric vacuum pump of a vacuum brake booster of a vehicle, said method comprising the steps of detecting the level of vacuum in the brake booster, detecting ambient atmospheric pressure, determining a pump deactivation threshold as a percentage of maximum available vacuum by reference to the detected atmospheric pressure, and deactivating said pump when said level reaches said deactivation threshold.

Embodiments of the invention thus ensure that the deactivation threshold is set in accordance with ambient atmospheric pressure, rather than a pre-set value according to for example atmospheric pressure at sea level. In consequence the vacuum pump is better able to meet a deactivation threshold at high altitude, and the effects of extended or continuous running of the pump can be avoided.

The invention is particularly economical to implement in vehicles current at the time of the invention. A brake booster vacuum pressure switch or sensor is standard provision for activating and deactivating an electric vacuum pump according to fixed sea level thresholds. An atmospheric pressure sensor is provided for management of internal combustion (IC) engine emissions.

Accordingly additional sensors are not required, merely some different coding of a pump control system and provision of the existing atmospheric pressure signal to the pump control system. The control system of the electric vacuum pump may for example be part of the ABS (anti-lock braking system) control module.

The percentage of maximum available vacuum which determines the deactivation threshold by reference to ambient pressure may be fixed, or may be settable within a pre-determined range. Typically the method of the invention will be implemented in software of the vehicle, and the percentage may be a fixed value, or may be a vehicle specific value selected from a look-up table or the like. Alternatively the percentage may be settable to suit the end user, for example by the vehicle supplier in the country of use. The latter may be preferable where a vehicle is first sold in a region of high altitude.

In one embodiment, the threshold is a fixed percentage of maximum available vacuum for all altitudes—in other words a vehicle will have a pre-set percentage applicable at any altitude which the vehicle may reach. By 'altitude', we also include negative altitude (below sea level).

Activation of the electric vacuum pump can be by any suitable method, but typically also relies upon detection of a depleted level of vacuum in the brake booster.

The method of the invention may further include pump activation according to a threshold, which may also be a percentage of maximum available vacuum by reference to the detected atmospheric pressure. This activation threshold may be fixed for all altitudes and settable in the same way as to deactivation threshold is settable.

Typical threshold settings are activation at 65% of maximum available vacuum at the vehicle location, and the deactivation at 80% of maximum available vacuum at the vehicle location.

The effect of the invention is to provide that the range of operation of a vacuum pump (the difference between the on value and the off value) progressively reduces with altitude. This ensures a pump on value at a higher depression than if a fixed on/off range is provided, where a common pump off value is selected. Initial calibration is not required.

According to another aspect the invention there is provided a vehicle having an electric vacuum pump for a vacuum brake booster, a sensor providing an indication of the level of vacuum in the brake booster, a sensor for providing an indication of atmospheric pressure and a controller for implementing the methods of the invention.

The vehicle may be a hybrid having a battery, a traction motor, and an internal combustion engine. A control strategy may cease electric vehicle mode in the event of detection of a fault in an electric vacuum pump, and switch to IC engine mode whereby vacuum is provided via the IC engine.

Within the scope of this application it is envisaged that the various aspects, embodiments, examples, features and alternatives set out in the preceding paragraphs, in the claims, and/or in the following description and drawings may be taken independently or in any combination thereof. For example, features disclosed in connection with one embodiments are applicable to all embodiments, unless there is incompatibility of features.

Figure 2:
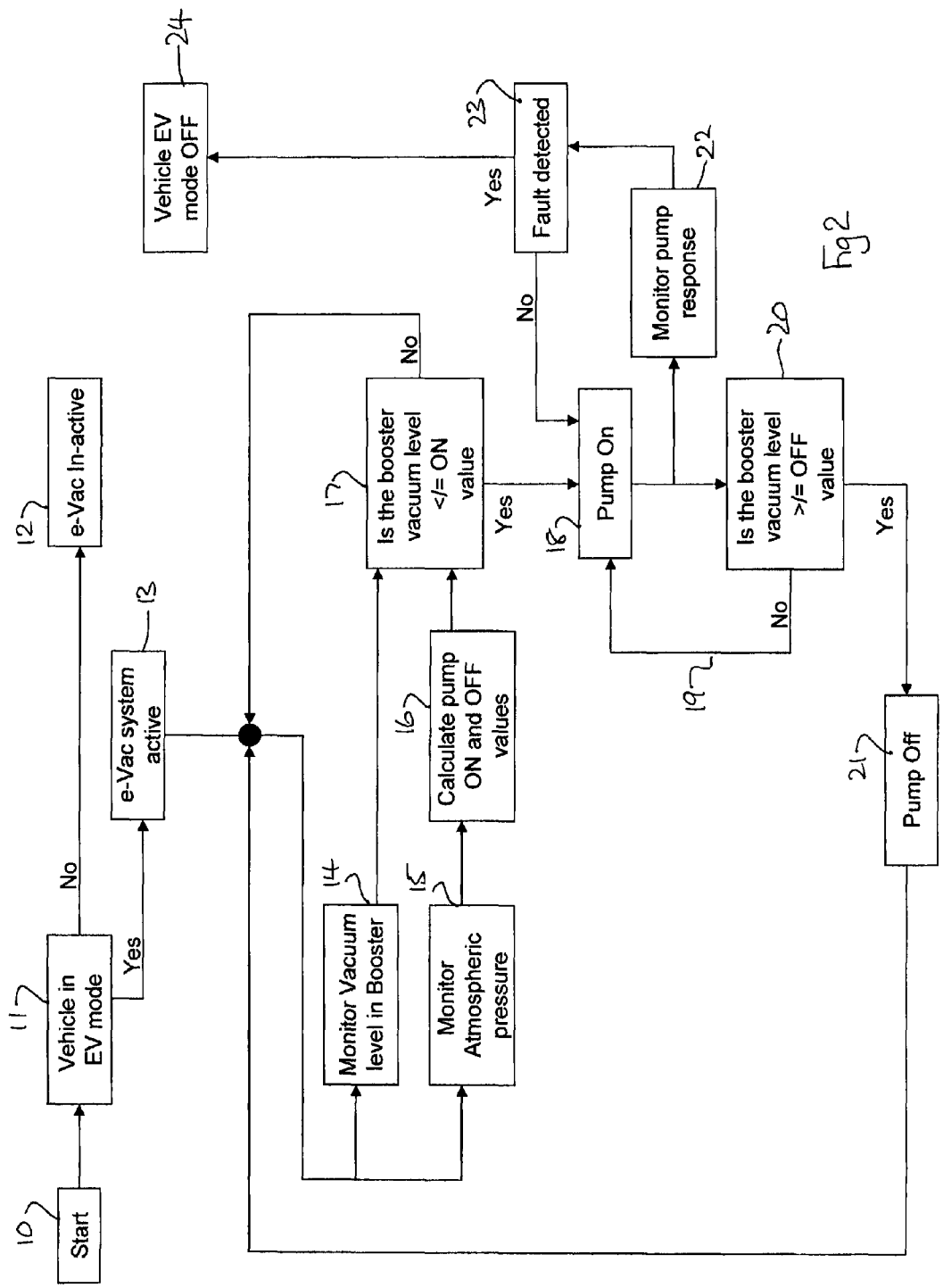

Other features of the invention will be apparent from the following description of an embodiment of the present invention, given by way of example only with reference to the accompanying drawings in which:

FIG. 1 is a graphical representation of on and off switching of a vacuum pump with varying atmospheric pressure; and FIG. 2 is a control strategy for a hybrid vehicle having an electric booster vacuum pump.

Figure 3:
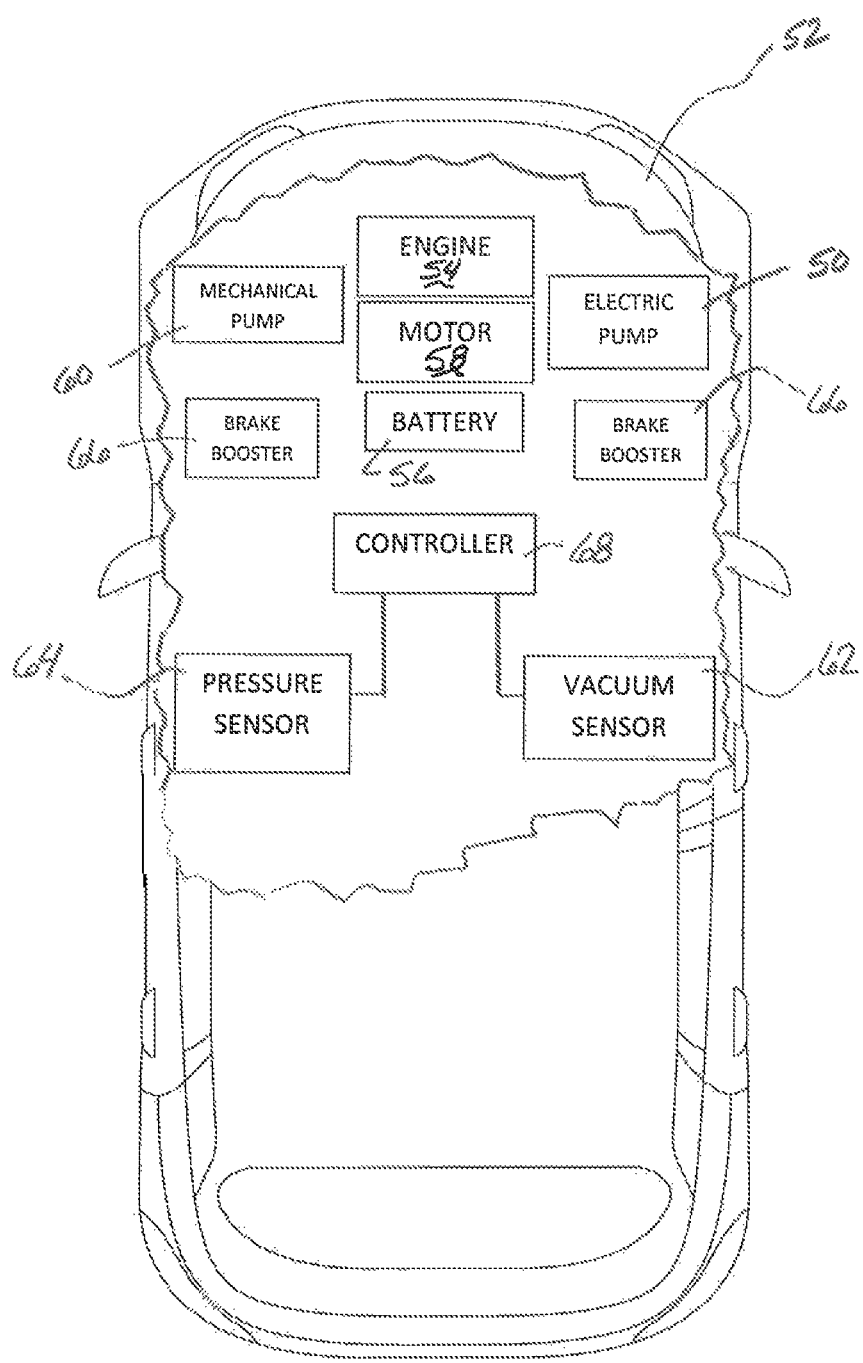

FIG. 3 schematically illustrates a vehicle including a pump control system designed according to an embodiment of this invention.

FIG. 1 illustrates the characteristic of a typical electric vacuum pump as altitude increases from sea level to 4000 meters. Reducing atmospheric pressure is shown on the y axis, and thus at sea level atmospheric pressure is about 101 kPa. Accordingly maximum available vacuum at sea level is about −101 kPa.

Line A represents the fall in atmospheric pressure as altitude increases. At 4000 m, atmospheric pressure falls to about 63 kPa.

Line B represents deactivation of a typical prior art pump, in which the deactivation setting is a fixed percentage value below atmospheric pressure at sea level.

Line C represents the maximum depression achievable by an exemplar electric pump. It will be understood that the performance of vacuum pumps is a matter of specification, but that line C shows what is reasonably achievable within the design and cost constraints of a typical motor vehicle—typically about 85% of MAV at sea level.

Point D represents the altitude at which a pump would not deactivate, but run continuously under a prior art control strategy. At this and higher altitudes the deactivation pressure is lower than the minimum achievable by the pump. Accordingly point D should be selected to be less than the maximum altitude at which the vehicle is intended to operate.

Line E represents deactivation of the same pump, with a deactivation setting being determined as 80% of the maximum available vacuum by reference to atmospheric pressure, at the location/altitude of the vehicle. Thus at sea level deactivation vacuum is 80% of −101 kPa=−80 kPa, and the pump deactivates at about 20 kPa absolute. At 4000 m, deactivation vacuum is 80% of −63 kPa=−50 kPa, and the pump deactivates at about 13 kPa absolute. This deactivation threshold is achievable since the pump is able to reach a maximum depression of about 9 kPa absolute. It will be noted that lines C and E do not coincide—accordingly a vacuum pump in good condition can be relied upon to reach sufficient depression to switch off.

Electric vacuum pumps are selected according to performance, cost, duty and other parameters known to a suitably skilled engineer. The invention permits specification and selection of a pump which will work within achievable limits at all altitudes that a vehicle may reach, in use.

The activation characteristic, if based on a prior art fixed value lies between lines A & B, and substantially parallel thereto. A fixed activation value based on atmospheric pressure at sea level (line G) should ideally meet or be just above the deactivation line E at maximum vehicle altitude, giving an on-switching value at sea level of about 55 kPa absolute. This on-switching value may not give a sufficient reserve of vacuum to achieve a desirable level of braking assistance at all times, and a lower value for on-switching of about 40 kPa absolute may be required. In the latter case however, the activation point meets line E at about 2500 m altitude, so that the vacuum pump would be switched on but would not be able to provide enough vacuum to trigger the off switch and thus, would run continuously. To resolve this circumstance, the control software may implement a reduced percentage on-switching value above a pre-determined altitude (as indicated by measurements of atmospheric pressure), for example to say 55% of MAV at sea level. A characteristic having several such step changes may be implemented in order to combine a set on-switching value with off-switching determined according to ambient atmospheric pressure.

In the alternative activation may however be determined according to a percentage of maximum available vacuum by reference to atmospheric pressure, and the characteristic of line F is produced. Thus characteristic lies above line E and is substantially parallel, but converging slightly as altitude increases. An activation setting of 65% is illustrated, giving activation values of about 35 kPa absolute at sea level, and about 22 kPa absolute at 4000 m.

Activation and de-activation settings are typically re-calculated periodically, for example at each 'ignition-on' or 'start' event. An alternative or additional strategy is to re-calculate if atmospheric pressure varies by a set amount during use of the vehicle. Other strategies are possible.

The method of the invention is particularly suitable for controlling an electric vacuum pump 50 of a hybrid vehicle 52 having both an internal combustion engine 54, a traction battery 56 and an electric motor 58. When the internal combustion engine is selected, brake booster vacuum is typically provided by a mechanical engine-driven vacuum pump 60.

In electric traction mode, the internal combustion engine is not active and accordingly a suitable electric vacuum pump is provided. A control strategy for such an electric pump is illustrated in FIG. 2.

When use of the vehicle is required (10) the control system immediately determines whether EV (electrical vehicle) mode is selected (11). If not, e-Vac (electric vacuum assistance) is considered inactive (12).

If yes, the e-Vac system is considered active (13), and sensors 62, 64 for booster vacuum level (14) of a brake booster 66 and atmospheric pressure (15) are interrogated by a controller 68. Activation and deactivation thresholds are calculated (16) according to percentage settings, and a comparison made with booster vacuum levels (17) to determine if the electric pump should be activated.

If yes, the pump is activated (18) and the level of vacuum increases. Booster vacuum level continues to be monitored (19) and a comparison is made repeatedly or continuously with the deactivation threshold (20); when the deactivation threshold is reached the pump is deactivated (21) and the system resumes the monitoring and threshold calculating state (14-16).

A check routine is provided whereby pump response is repeatedly or continuously monitored (22) whilst the pump is activated. A fault detection routine (23) applies certain criteria to determine existence of a fault, in which case the EV mode is deactivated (24) so that the vehicle is placed in internal combustion engine mode; in this mode a mechanical vacuum pump or inlet manifold depression may provide vacuum for the vehicle brake booster. Appropriate warning may be given to the vehicle driver via a dashboard display.

The criteria for electric pump fault may include:
excessive pump temperature.
excessive pump running time,
failure of electric pump activation after a number (e.g. 3) applications of the vehicle wheel brakes, detected for example from a brake pressure switch for the vehicle brake lights.

In the event that the vehicle is not in EV mode, the electric vacuum pump may be enabled to assist or substitute for a mechanical engine driven vacuum pump.

The invention claimed is:

1. A method of controlling an electric vacuum pump of a vacuum brake booster of a vehicle, the method comprising:
   detecting a level of vacuum in the brake booster;
   detecting ambient atmospheric pressure;
   determining a pump deactivation threshold as a percentage of maximum available vacuum, in accordance with the detected atmospheric pressure; and
   deactivating said pump when said level reaches said deactivation threshold.

2. The method according to claim 1, wherein the percentage of maximum available vacuum is fixed for all altitudes.

3. The method according to claim 1, wherein the percentage of maximum available vacuum is settable within a pre-determined range.

4. The method according to claim 3, wherein said deactivation threshold is in the range 75-85%.

5. The method of claim 1, comprising:
   determining a pump activation threshold as a percentage of maximum available vacuum in accordance with the detected atmospheric pressure; and
   activating said pump when said level reaches said activation threshold.

6. The method of claim 5, wherein the percentage of maximum available vacuum is fixed for all altitudes.

7. The method of claim 5, wherein the percentage of maximum available vacuum is settable within a pre-determined range.

8. The method of claim 7, wherein said activation threshold is in the range 60-70%.

9. The method of claim 1, wherein said pump de-activation threshold is determined periodically.

10. The method of claim 9, wherein a pump activation threshold is determined periodically.

11. The method of claim 1, comprising monitoring operation of said electric pump for fault and if fault is detected de-activating said electric pump and substantially simultaneously activating a mechanical pump.

12. The method of claim 11, wherein said mechanical pump is driven by an internal combustion engine.

13. The method of claim 11, wherein said fault comprises detection of at least one of:
    said electric pump exceeding a temperature threshold;
    said electric pump exceeding a predetermined running time; and
    said electric pump failing to activate after a predetermined number of applications of the vehicle wheel brakes.

14. A pump control system configured to perform the method of claim 1.

15. A vehicle having an electric vacuum pump for a brake booster, a sensor providing a vacuum signal indicative of a level of vacuum in the brake booster, a sensor providing a pressure signal indicative of ambient atmospheric pressure, and a controller arranged to receive said vacuum and pressure signals, said controller being arranged to determine a de-activation threshold for said pump as a percentage of maximum available vacuum in accordance with ambient atmospheric pressure, and to de-activate said pump if said vacuum signal reaches said de-activation threshold.

16. A vehicle according to claim 15, wherein said controller is arranged to calculate an activation threshold for said pump as a percentage of maximum available vacuum in accordance with ambient atmospheric pressure, and to activate said pump if said vacuum signal reaches said activation threshold.

17. A vehicle according to claim 15, wherein the vehicle is a hybrid vehicle having an internal combustion engine, a battery and an electric traction motor.

* * * * *